(12) United States Patent
Takahashi

(10) Patent No.: US 10,300,597 B2
(45) Date of Patent: May 28, 2019

(54) ROBOT AND METHOD OF OPERATING ROBOT

(71) Applicant: Seiko Epson Corporation, Tokyo (JP)

(72) Inventor: Masaru Takahashi, Matsumoto (JP)

(73) Assignee: Seiko Epson Corporation (JP)

( * ) Notice: Subject to any disclaimer, the term of this patent is extended or adjusted under 35 U.S.C. 154(b) by 359 days.

(21) Appl. No.: 15/152,937

(22) Filed: May 12, 2016

(65) Prior Publication Data

US 2016/0256997 A1 Sep. 8, 2016

Related U.S. Application Data

(63) Continuation of application No. 14/197,759, filed on Mar. 5, 2014, now Pat. No. 9,381,641.

(30) Foreign Application Priority Data

Jun. 10, 2013 (JP) ................................. 2013-121577

(51) Int. Cl.
  *B25J 9/00* (2006.01)
  *B25J 5/00* (2006.01)
  *B25J 9/16* (2006.01)

(52) U.S. Cl.
  CPC ............. *B25J 5/007* (2013.01); *B25J 9/0087* (2013.01); *B25J 9/1692* (2013.01); *Y10S 901/01* (2013.01); *Y10S 901/02* (2013.01)

(58) Field of Classification Search
  CPC .................................. B25J 5/007; B25J 9/0087
  See application file for complete search history.

(56) References Cited

U.S. PATENT DOCUMENTS

| | | | |
|---|---|---|---|
| 2,858,947 A | 11/1958 | Chapman, Jr. | |
| 4,757,458 A | 7/1988 | Takemoto et al. | |
| 5,177,563 A | 1/1993 | Everett et al. | |
| 6,371,713 B1 | 4/2002 | Nishimura et al. | |
| 8,169,596 B2* | 5/2012 | Weiss | G01C 3/00 356/3.1 |
| 9,193,573 B1* | 11/2015 | Troy | B66F 7/065 |
| 9,259,634 B1* | 2/2016 | Bouse | A63B 69/34 |
| 2002/0094265 A1 | 7/2002 | Momoki | |
| 2002/0137346 A1 | 9/2002 | Donaldson et al. | |
| 2004/0010345 A1 | 1/2004 | Kim | |
| 2005/0166413 A1 | 8/2005 | Crampton | |
| 2008/0125908 A1* | 5/2008 | Sjoberg | G05B 19/414 700/247 |

(Continued)

FOREIGN PATENT DOCUMENTS

| | | |
|---|---|---|
| CN | 102026783 A | 4/2011 |
| JP | 60-141485 A | 7/1985 |

(Continued)

*Primary Examiner* — Peter D Nolan
(74) *Attorney, Agent, or Firm* — Harness, Dickey & Pierce, P.L.C.

(57) ABSTRACT

A robot includes a base, a body connected to the base, a pair of articulated arms rotatably connected to the body, and a moving mechanism adapted to move the body toward or away from the base. Further, a relative positional relationship with a workbench is detected by moving the body with respect to the base using the moving mechanism while keeping the articulated arms in predetermined postures while facing the workbench, and then making the articulated arms contact the workbench.

16 Claims, 8 Drawing Sheets

(56) References Cited

U.S. PATENT DOCUMENTS

| | | |
|---|---|---|
| 2008/0243306 A1 | 10/2008 | Koike et al. |
| 2011/0029133 A1 | 2/2011 | Okazaki et al. |
| 2012/0116586 A1 | 5/2012 | Fujii |
| 2013/0195598 A1 | 8/2013 | Furuichi |
| 2013/0226340 A1* | 8/2013 | Buchstab ............... B25J 5/04 700/245 |
| 2013/0226341 A1* | 8/2013 | Sturm .................... B25J 5/00 700/245 |
| 2013/0331989 A1 | 12/2013 | Umeno et al. |
| 2014/0297130 A1* | 10/2014 | Griffiths ............. B62D 6/008 701/42 |
| 2014/0316564 A1* | 10/2014 | Nakamura ........... G05B 19/19 700/245 |

FOREIGN PATENT DOCUMENTS

| | | |
|---|---|---|
| JP | 60-238290 A | 11/1985 |
| JP | 62-087153 A | 4/1987 |
| JP | 02-185383 | 7/1990 |
| JP | 07-053054 | 2/1995 |
| JP | 07-251943 | 10/1995 |
| JP | 10-337637 | 12/1998 |
| JP | 11-142183 | 5/1999 |
| JP | 2003-158170 A | 5/2003 |
| JP | 2009-279663 A | 12/2009 |

* cited by examiner

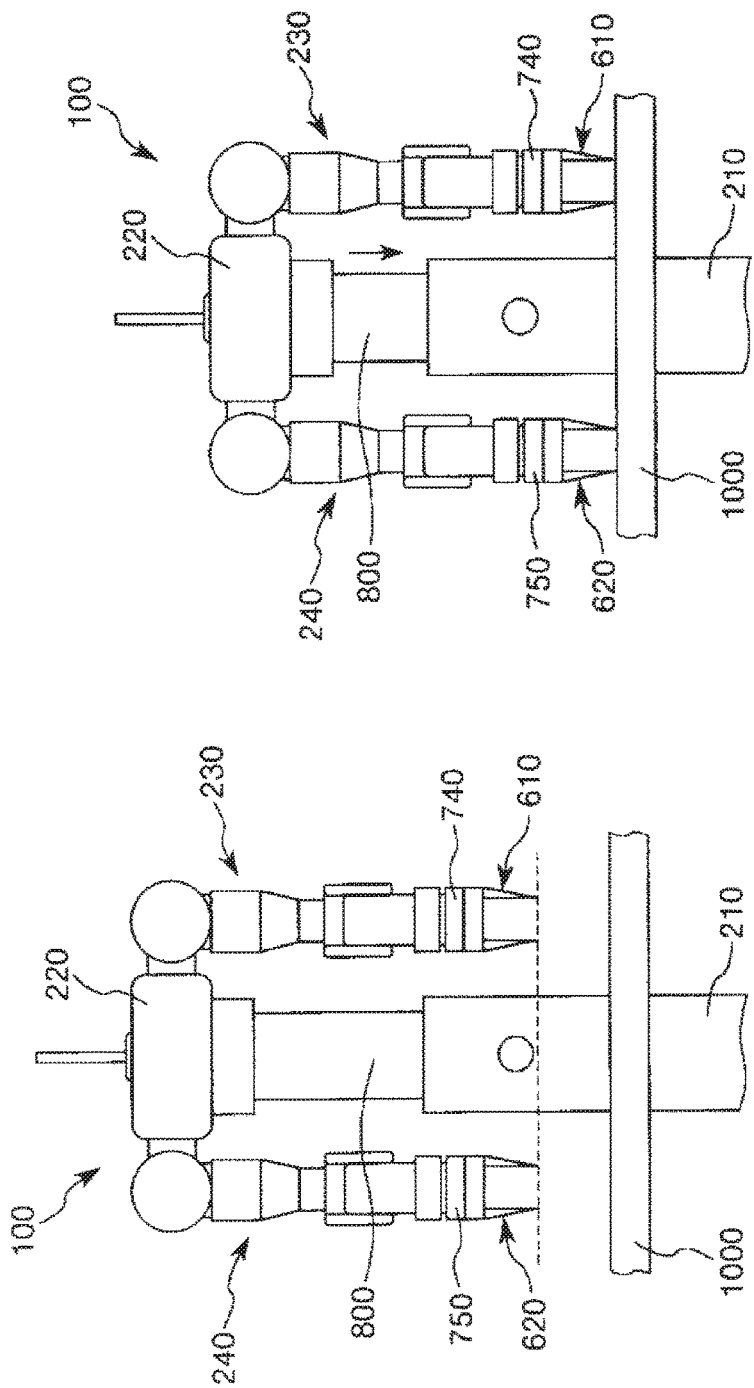

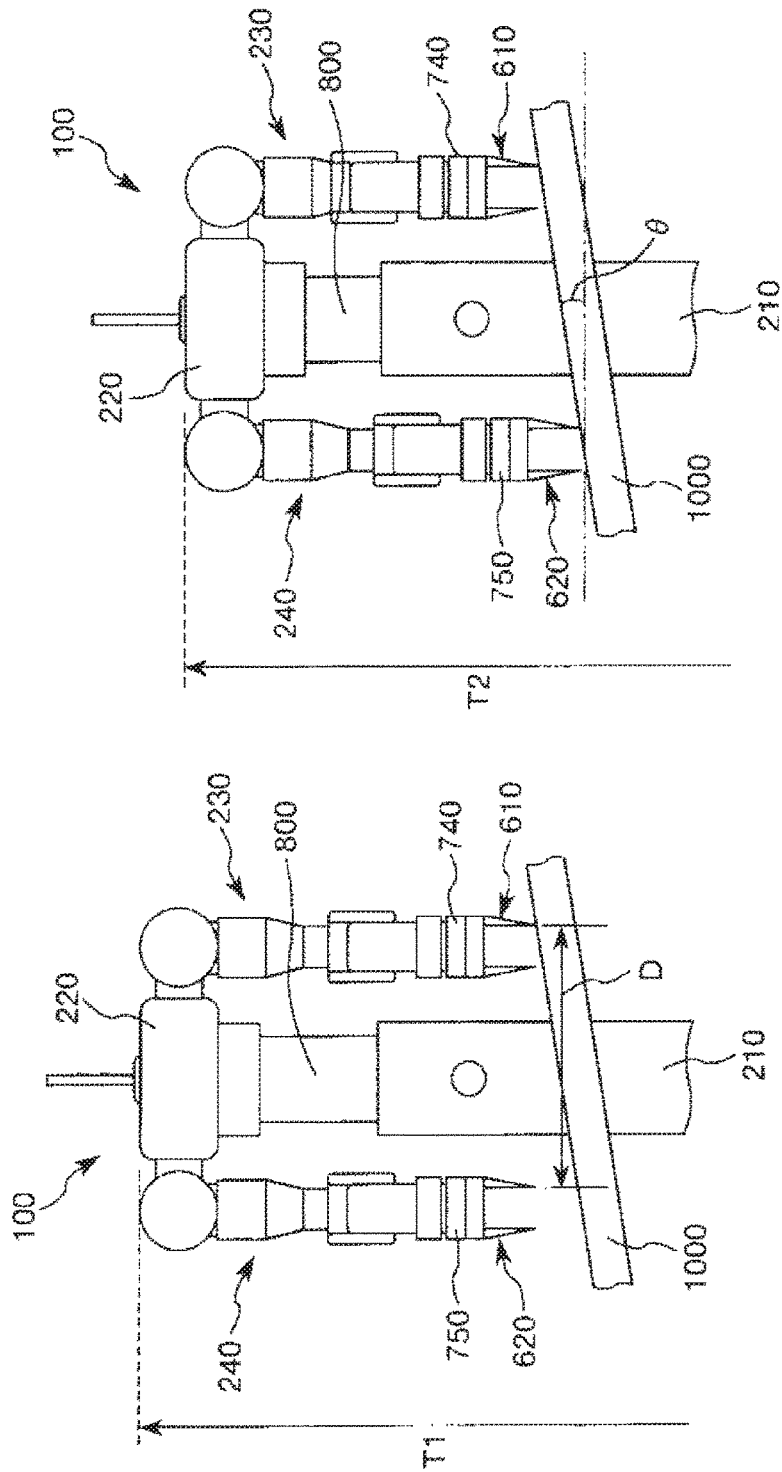

ROBOT AND METHOD OF OPERATING ROBOT

CROSS-REFERENCE TO RELATED APPLICATIONS

This is a continuation patent application of U.S. application Ser. No. 14/197,759, filed Mar. 5, 2014, which claims priority to Japanese Patent Application No. 2013-121577, filed Jun. 10, 2013, both of which are incorporated by reference herein in their entireties.

BACKGROUND

1. Technical Field

The present invention relates to a robot and a method of operating a robot.

2. Related Art

A robot described in JP-A-2009-279663 has a base, a body rotatably connected to the base, and two articulated arms rotatably connected to the body.

However, since such a dual-arm robot is unable to vary the height of the body, the driving range and the posture of the articulated arms are limited depending on the height of the workbench. This causes a problem in that the accuracy and the reliability of robotic operations are degraded.

SUMMARY

An advantage of some aspects of the invention is to provide a robot and a method of operating a robot, which are capable of setting the height of the body to a desired position in accordance with the height of the workbench. As a result, the robot and method are superior in the accuracy and the reliability of robotic operations.

A robot according to an aspect of the invention includes a base, a body connected to the base, a pair of articulated arms rotatably connected to the body, and a moving mechanism adapted to move the body toward or away from the base. That is, the moving mechanism is adapted to change a height of the body relative to the base.

With this configuration, it is possible to provide a robot which is capable of setting the height of the body to a desired position in accordance with the height of the workbench, and is therefore superior in the accuracy and the reliability of robotic operations.

In the robot according to the aspect of the invention, it is preferable that a relative positional relationship with a workbench is detected by moving the body with respect to the base using the moving mechanism while keeping the articulated arms in predetermined postures in a state of facing to the workbench, and then making the articulated arms contact the workbench.

With this configuration, the relative positional relationship with the workbench can easily and surely be detected.

In the robot according to the aspect of the invention, it is preferable that a moving amount of the body with respect to the base is determined based on the relative positional relationship.

With this configuration, it is possible to set the body to a position suitable for operating on the workbench.

In the robot according to the aspect of the invention, it is preferable that a tilt of the workbench is detected using a moving amount of the body with respect to the base in a case in which one of the articulated arms has contact with the workbench, and a moving amount of the body with respect to the base in a case in which the other of the articulated arms has contact with the workbench.

With this configuration, the tilt of the workbench can easily and surely be detected.

A method of operating a robot according to another aspect of the invention includes setting a robot, which includes a base, a body connected to the base, a pair of articulated arms rotatably connected to the body, and a moving mechanism adapted to move the body toward or away from the base, so as to face to a workbench, detecting a relative positional relationship between the workbench and the robot by moving the body with respect to the base using the moving mechanism while keeping the articulated arms in predetermined postures, and then making the articulated arms contact the workbench, and determining a moving amount of the body with respect to the base based on a detection result in the detecting.

With this configuration, it is possible to provide a method of operating a robot, which is capable of setting the height of the body to a desired position in accordance with the height of the workbench, and is therefore superior in the accuracy and the reliability of robotic operations.

In the method of operating a robot according to the aspect of the invention, it is preferable to detect a tilt of the workbench using a moving amount of the body with respect to the base in a case in which one of the articulated arms contacts the workbench, and a moving amount of the body with respect to the base in a case in which the other of the articulated arms contacts the workbench.

With this configuration, the tilt of the workbench can easily and surely be detected.

In the method of operating a robot according to the aspect of the invention, it is preferable to control the driving of the robot based on the tilt of the workbench.

With this configuration, the accuracy of the robot control is improved.

BRIEF DESCRIPTION OF THE DRAWINGS

Embodiments of the invention will be described with reference to the accompanying drawings, wherein like numbers reference like elements.

FIGS. 7A and 7B are diagrams for explaining a method of detecting the height of the workbench.

FIGS. 8A and 8B are diagrams for explaining the method of detecting the height of the workbench.

DESCRIPTION OF AN EXEMPLARY EMBODIMENT

Hereinafter, a robot and a method of operating a robot according to the invention will be explained in detail based on a preferred embodiment shown in the accompanying drawings.

Figure 1:
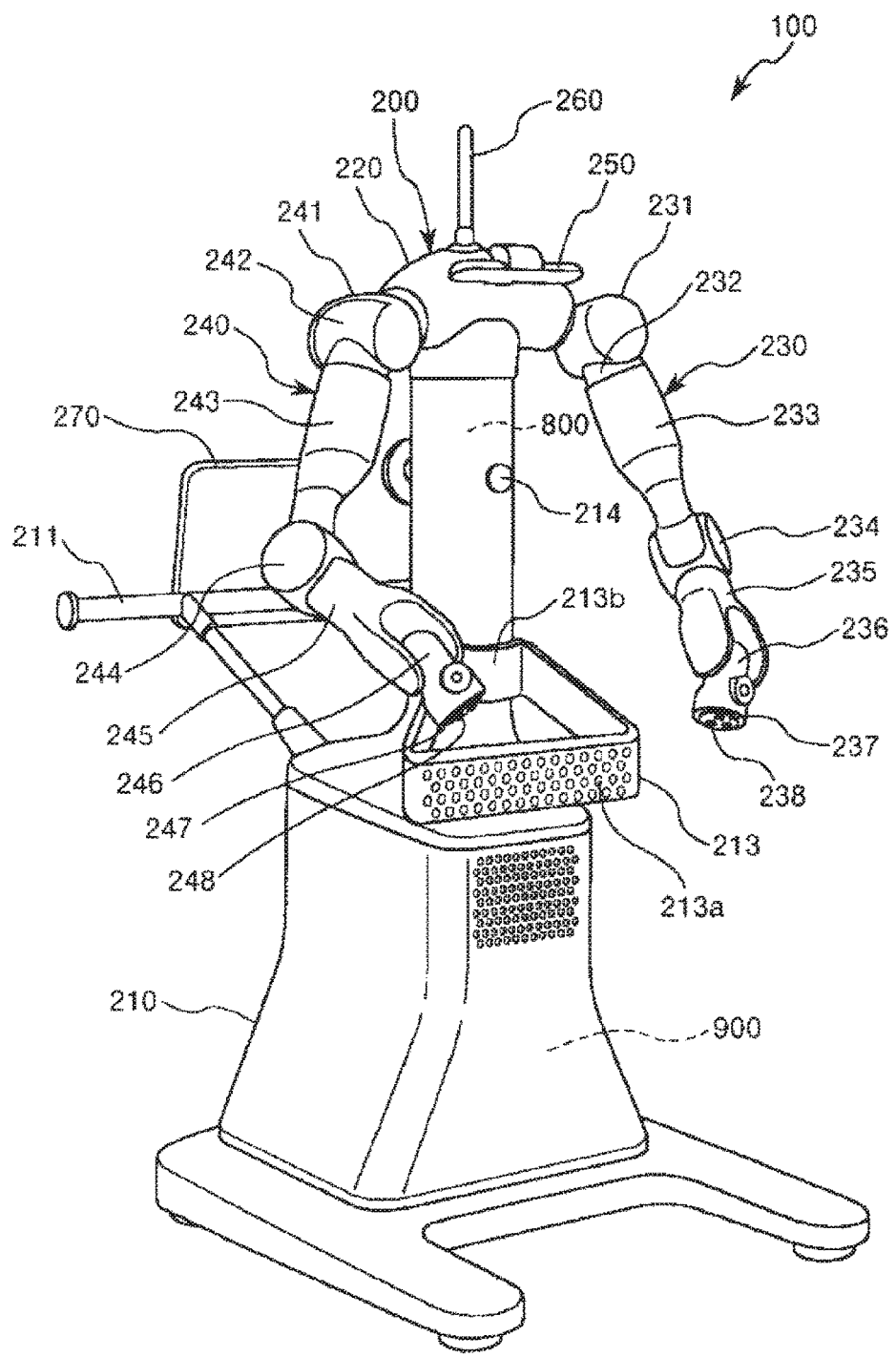
FIG. 1 is a perspective view showing a robot according to a preferred embodiment of the invention.
Figure 2:
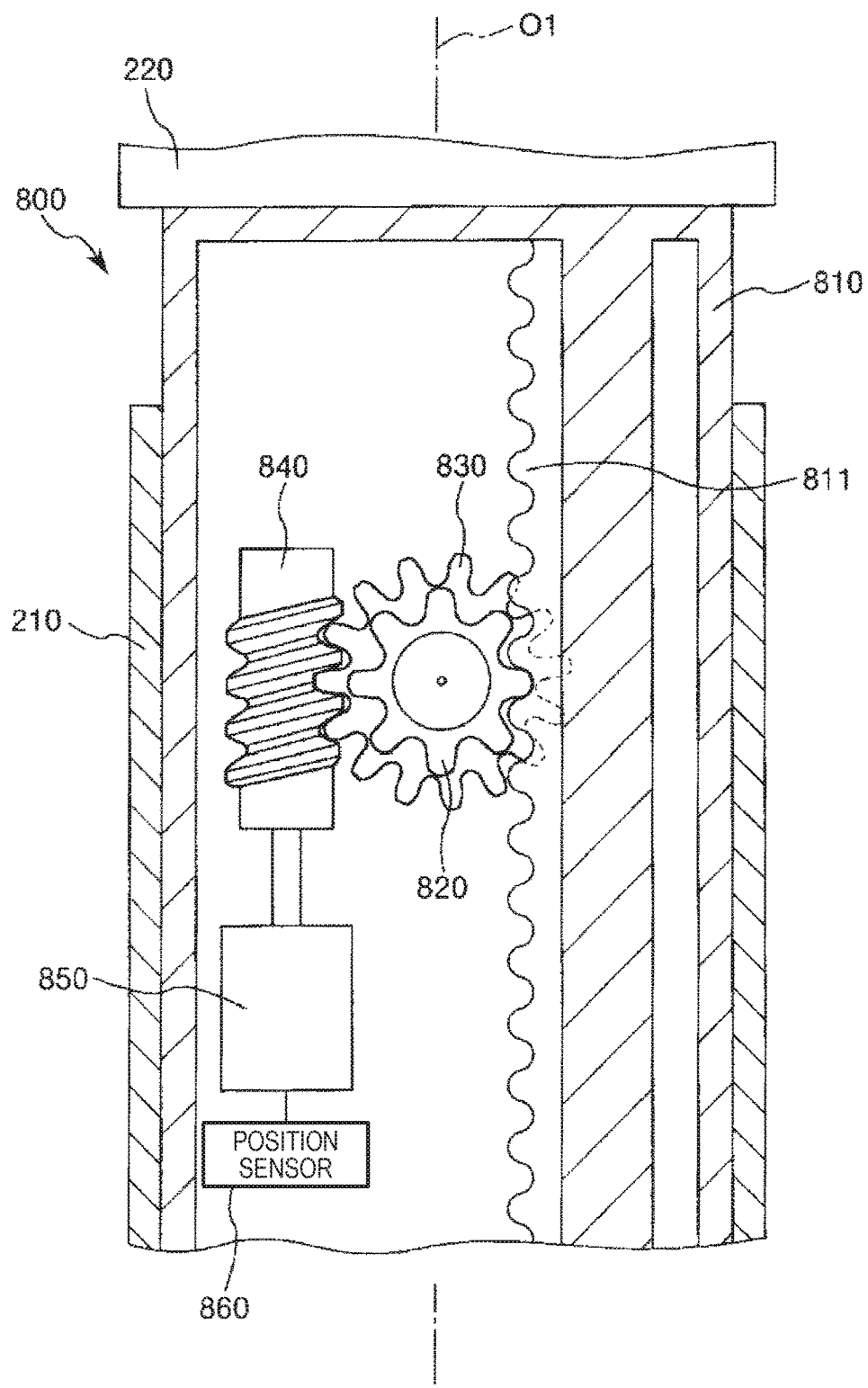
FIG. 2 is a cross-sectional view showing an elevating mechanism provided to the robot shown in FIG. 1.
Figure 3:
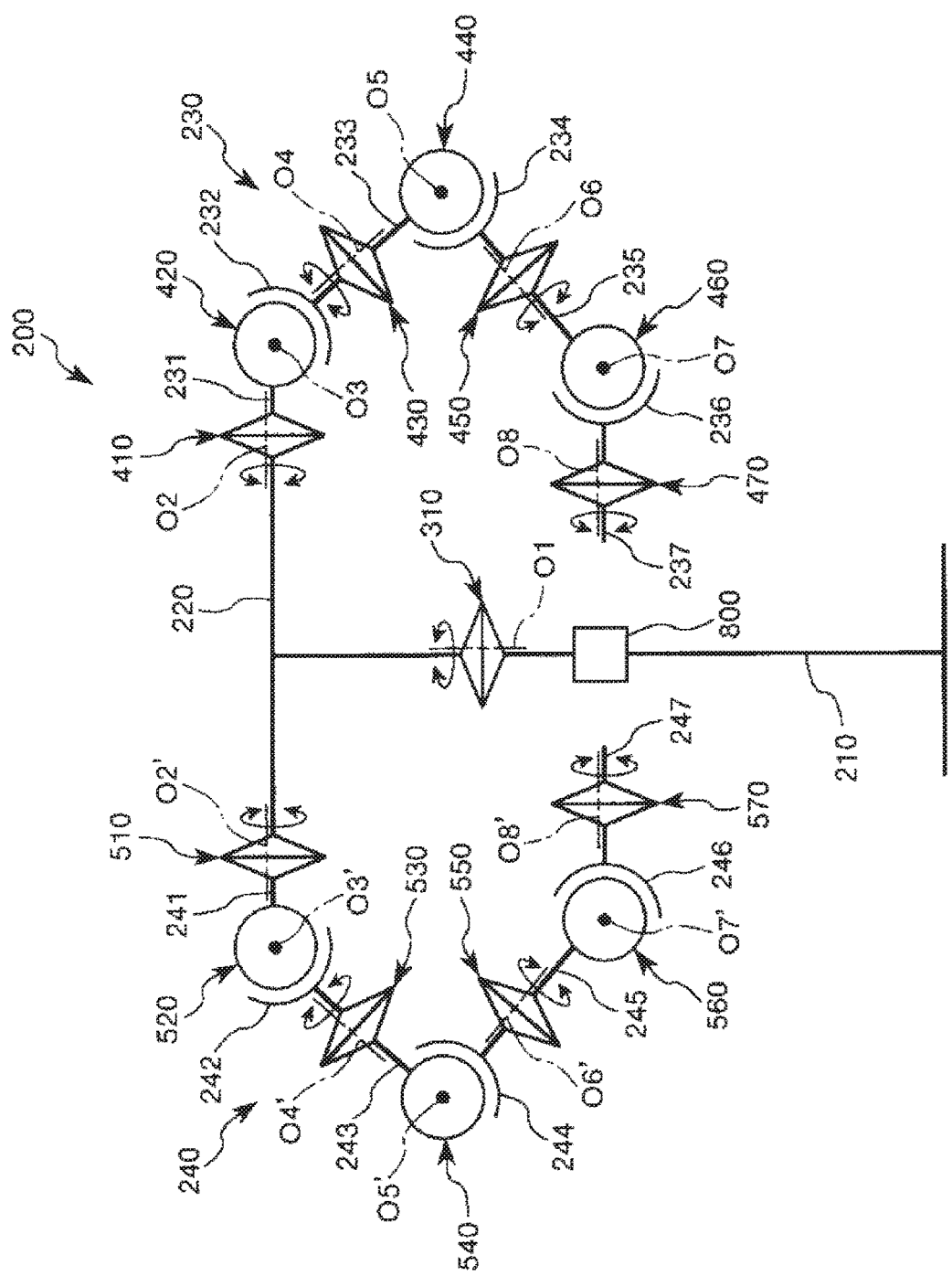
FIG. 3 is a schematic diagram showing rotation axes of the robot shown in FIG. 1.
Figure 4:
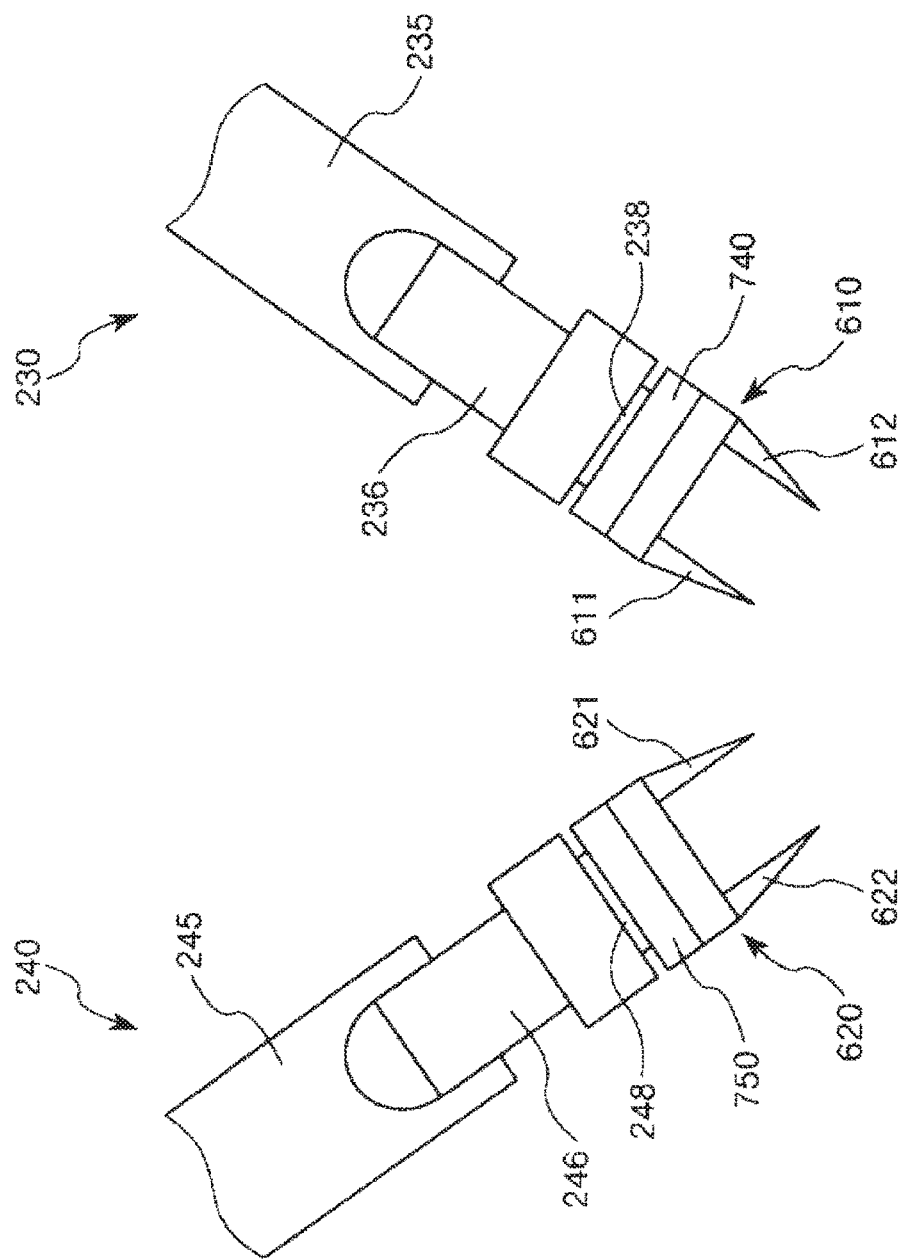
FIG. 4 is a diagram showing end effectors attached to the robot shown in FIG. 1.
Figure 5:
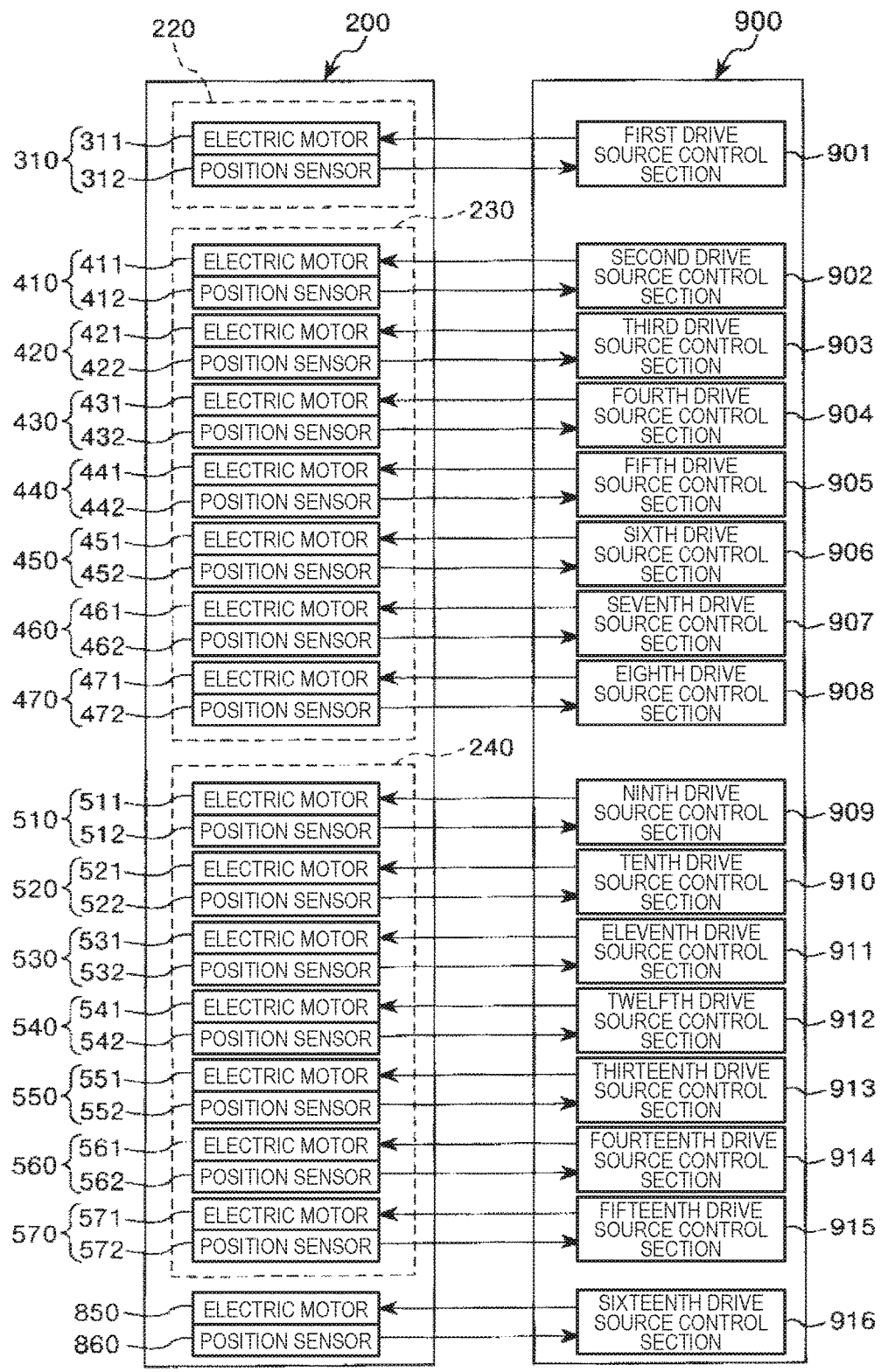
FIG. 5 is a block diagram showing a control system of the robot shown in FIG. 1.
Figure 6:
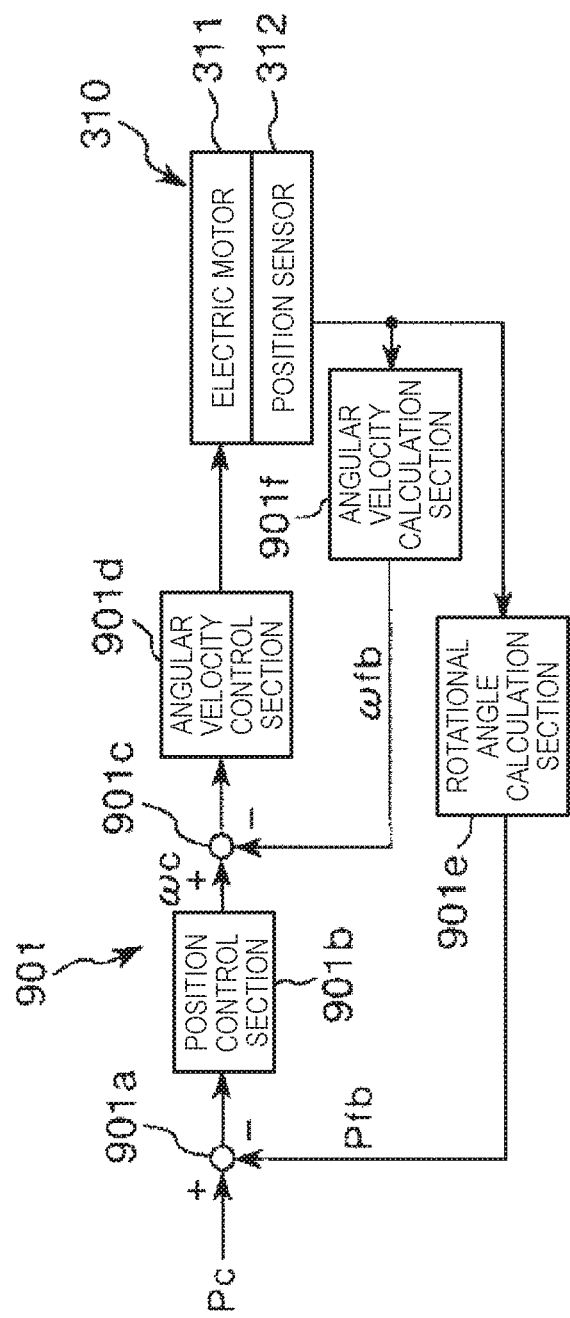
FIG. 6 is a block diagram showing drive control of the robot shown in FIG. 1.

FIG. 1 is a perspective view showing the robot according to the preferred embodiment of the invention. FIG. 2 is a cross-sectional view showing an elevating mechanism provided to the robot shown in FIG. 1. FIG. 3 is a schematic diagram showing rotation axes of the robot shown in FIG. 1. FIG. 4 is a diagram showing end effectors attached to the robot shown in FIG. 1. FIG. 5 is a block diagram showing a control system of the robot shown in FIG. 1. FIG. 6 is a block diagram showing drive control of the robot shown in FIG. 1. FIGS. 7A and 7B are diagrams for explaining a method of detecting the height of the workbench. FIGS. 8A and 8B are diagrams for explaining the method of detecting the height of the workbench.

The robot 100 shown in FIG. 1 is a dual-arm robot, and can be used in a manufacturing process for manufacturing precision equipment such as watches. Robot 100 has a robot main body 200, and a robot control device 900 for controlling the action of the robot main body 200. It should be noted that the arrangement of the robot 100 is not particularly limited, but the case of arranging the robot 100 perpendicularly (so that a rotation axis O1 described later is perpendicular) to a horizontal floor will hereinafter be explained for the sake of convenience of explanation.

Robot Main Body

As shown in FIG. 1, the robot main body 200 has a base 210, a body 220 connected to the base 210, a pair of articulated arms 230, 240 connected to both sides of the body 220, a stereo camera 250 and a signal light 260 provided to the body 220, a hand camera (not shown) provided to each of the articulated arms 230, 240, and a monitor 270 disposed on a rear side of the body 220.

According to such a robot 100 as described above, the operation can be performed while checking the positions of parts, tools, and so on disposed on the workbench using the stereo camera 250 and the hand cameras. Further, a state (e.g., a drive state, a normal halting state, and an abnormal halting state) of the robot 100 can easily be checked using the signal light 260. Further, since the information related to the robot 100 is displayed on the monitor 270, the state of the robot 100 can easily be checked. The monitor 270 is formed of, for example, a touch panel, and by operating the touch panel, it is possible to switch the display screens, provide an instruction to the robot 100, or change the instruction having been provided.

Base

The base 210 is provided with a plurality of wheels (rotating members) for making the movement of the robot 100 easy, a lock mechanism (not shown) for locking each of the wheels, and a handle (a grip section) 211 to be gripped when moving the robot 100. By releasing the lock mechanism and then gripping the handle 211 to push or pull the handle 211, the robot 100 can be moved at will, and by locking the wheels with the lock mechanism, the robot 100 can be fixed at a predetermined position. As described above, by making the movement of the robot 100 easy, the convenience of the robot 100 is enhanced. It should be noted that the wheels, the lock mechanism, and the handle 211 can each be eliminated, if so desired.

Further, the base 210 is provided with a bumper 213 to contact the workbench (see FIGS. 7 and 8). By making the bumper 213 contact a side surface of the workbench, it is possible to make the robot 100 face the workbench at a predetermined distance. Therefore, unintended contact and so on between the robot 100 and the workbench can be prevented. It should be noted that the bumper 213 has a contact section 213a to contact the workbench, and a fixation section 213b to be fixed to the base 210, and is attached to the base 210 in FIG. 1 so that the contact section 213a is located on a lower side of the fixation section 213b. Such a bumper 213 as described above is detachably attached to the base 210, and the orientation of the bumper 213 can be vertically inverted. Specifically, it is also possible to attach the bumper 213 to the base 210 so that the contact section 213a is located above the fixation section 213b in contrast to FIG. 1. By changing the height of the contact section 213a in such a manner as described above, it becomes possible to cope with workbenches that have different heights.

It should be noted that the bumper 213 can be fixed to an elevating section 810 described later instead of the base 210. Thus, the bumper 213 integrally moves up and down together with the body 220, and therefore, the height of the bumper 213 is automatically adjusted by an elevating mechanism 800. Therefore, a highly convenient robot 100 is obtained.

Further, the base 210 is provided with an emergency stop button 214, and in an emergency, the emergency stop of the robot 100 can be achieved by pressing the emergency stop button 214.

Body

As shown in FIG. 2, the body 220 is connected to the base 210 via the elevating mechanism (a moving mechanism) 800 so as to be able to move up and down in a vertical direction (a direction of the rotation axis O1). The configuration of the elevating mechanism 800 is not particularly limited so long as the mechanism is capable of moving the body 220 up and down with respect to the base 210. As shown in FIG. 2, the elevating mechanism 800 includes the elevating section 810 having a cylindrical shape and provided with a rack 811 disposed therein, a pinion 820 engaging with the rack 811, a worm wheel 830 for rotating the pinion 820, a worm 840 for rotating the worm wheel 830, an electric motor 850 as a drive source for rotating the worm 840, and a position sensor 860 for detecting the rotational angle of the electric motor 850. The elevating section 810 is connected to the body 220, and the pinion 820, the worm wheel 830, the worm 840, and the electric motor 850 are each fixed to the base 210. When driving the electric motor 850, power is transmitted to the pinion 820 via the worm 840 and the worm wheel 830, and the rack 811 moves with the rotation of the pinion 820. Thus, the body 220 moves up or down together with the elevating section 810 with respect to the base 210. Further, by using the worm wheel 830 and the worm 840, even in the case of stopping the electric motor 850, the position (the height) of the elevating section 810 can be maintained. It should be noted that, for example, a servo motor such as an AC servo motor or a DC servo motor can be used as the electric motor 850, and an encoder, a rotary encoder, a resolver, a potentiometer, and so on can be used as the position sensor 860. Further, it is also possible to dispose a reduction gear for reducing the rotational speed of the electric motor 850 between the electric motor 850 and the worm 840.

Further, the body 220 is connected to the base 210 (the elevating section 810) via a joint mechanism 310 so as to be rotatable around the rotation axis O1. The rotation axis O1 extends in a vertical direction. The configuration of the joint mechanism 310 is not particularly limited so long as the mechanism is capable of rotating the body 220 with respect to the base 210 (the elevating section 810) around the rotation axis O1. In the present embodiment, as shown in FIG. 5, the joint mechanism 310 has an electric motor 311 as a drive source, a reduction gear (not shown) for reducing the rotational speed of the electric motor 311, and a position sensor 312 for detecting the rotational angle of the electric motor 311. A servo motor such as an AC servo motor or a DC servo motor, for example, can be used as the electric motor 311, a planetary-gear reduction gear, a harmonic drive (strain wave gearing; "Harmonic Drive" is a registered trademark), and so on, for example, can be used as the reduction gear, and an encoder, a rotary encoder, a resolver, a potentiometer, and so on, for example, can be used as the position sensor 312.

Articulated Arms

As shown in FIG. 1, the articulated arm 230 includes a first shoulder section (a first arm) 231 connected to the body 220 via a joint mechanism 410, a second shoulder section (a second arm) 232 connected to the first shoulder section 231 via a joint mechanism 420, an upper arm section (a third arm) 233 connected to the tip of the second shoulder section 232 via a twist mechanism 430, a first lower arm section (a fourth arm) 234 connected to the tip of the upper arm section 233 via a joint mechanism 440, a second lower arm section (a fifth arm) 235 connected to the tip of the first lower arm section 234 via a twist mechanism 450, a wrist section (a sixth arm) 236 connected to the tip of the second lower arm section 235 via a joint mechanism 460, and a connector section (a seventh arm) 237 connected to the tip of the wrist section 236 via a twist mechanism 470. Further, the connector section 237 is provided with a hand section 238, and an end effector 610 corresponding to the operation to be performed by the robot 100 is attached to the hand section 238 via a kinesthetic sensor 740 as shown in FIG. 4.

Further, as shown in FIG. 3, the joint mechanism 410 rotates the first shoulder section 231 with respect to the body 220 around a rotation axis O2 perpendicular to the rotation axis O1, the joint mechanism 420 rotates the second shoulder section 232 with respect to the first shoulder section 231 around a rotation axis O3 perpendicular to the rotation axis O2, the twist mechanism 430 rotates (twists) the upper arm section 233 with respect to the second shoulder section 232 around a rotation axis O4 perpendicular to the rotation axis O3, the joint mechanism 440 rotates the first lower arm section 234 with respect to the upper arm section 233 around a rotation axis O5 perpendicular to the rotation axis O4, the twist mechanism 450 rotates (twists) the second lower arm section 235 with respect to the first lower arm section 234 around a rotation axis O6 perpendicular to the rotation axis O5, the joint mechanism 460 rotates the wrist section 236 with respect to the second lower arm section 235 around a rotation axis O7 perpendicular to the rotation axis O6, and the twist mechanism 470 rotates (twists) the connector section 237 with respect to the wrist section 236 around a rotation axis O8 perpendicular to the rotation axis O7. According to such an articulated arm 230 as described above, bending/unbending of the joints (the shoulder, the elbow, and the wrist) and twist of the upper arm and the lower arm can be realized similar to the human arm with a relatively simple configuration.

The configuration of each of the joint mechanism 410, the joint mechanism 420, the twist mechanism 430, the joint mechanism 440, the twist mechanism 450, the joint mechanism 460, and the twist mechanism 470 is not particularly limited, but in the present embodiment, the configuration is substantially the same as the configuration of the joint mechanism 310 described above. Specifically, as shown in FIG. 5, the joint mechanism 410 includes an electric motor 411 as a drive source, a reduction gear (not shown) for reducing the rotational speed of the electric motor 411, and a position sensor 412 for detecting the rotational angle of the electric motor 411. Further, the joint mechanism 420 includes an electric motor 421 as a drive source, a reduction gear (not shown) for reducing the rotational speed of the electric motor 421, and a position sensor 422 for detecting the rotational angle of the electric motor 421. Further, the twist mechanism 430 includes an electric motor 431 as a drive source, a reduction gear (not shown) for reducing the rotational speed of the electric motor 431, and a position sensor 432 for detecting the rotational angle of the electric motor 431. Further, the joint mechanism 440 includes an electric motor 441 as a drive source, a reduction gear (not shown) for reducing the rotational speed of the electric motor 441, and a position sensor 442 for detecting the rotational angle of the electric motor 441. Further, the twist mechanism 450 includes an electric motor 451 as a drive source, a reduction gear (not shown) for reducing the rotational speed of the electric motor 451, and a position sensor 452 for detecting the rotational angle of the electric motor 451. Further, the joint mechanism 460 includes an electric motor 461 as a drive source, a reduction gear (not shown) for reducing the rotational speed of the electric motor 461, and a position sensor 462 for detecting the rotational angle of the electric motor 461. Further, the twist mechanism 470 includes an electric motor 471 as a drive source, a reduction gear (not shown) for reducing the rotational speed of the electric motor 471, and a position sensor 472 for detecting the rotational angle of the electric motor 471.

The articulated arm 240 has substantially the same configuration as the configuration of the articulated arm 230 described above. Specifically, as shown in FIG. 1, the articulated arm 240 includes a first shoulder section (a first arm) 241 connected to the body 220 via a joint mechanism 510, a second shoulder section (a second arm) 242 connected to the first shoulder section 241 via a joint mechanism 520, an upper arm section (a third arm) 243 connected to the tip of the second shoulder section 242 via a twist mechanism 530, a first lower arm section (a fourth arm) 244 connected to the tip of the upper arm section 243 via a joint mechanism 540, a second lower arm section (a fifth arm) 245 connected to the tip of the first lower arm section 244 via a twist mechanism 550, a wrist section (a sixth arm) 246 connected to the tip of the second lower arm section 245 via a joint mechanism 560, and a connector section 247 connected to the tip of the wrist section 246 via a twist mechanism 570. Further, the connector section 247 is provided with a hand section 248, and an end effector 620 corresponding to the operation to be performed by the robot 100 is attached to the hand section 248 via a kinesthetic sensor 750.

Further, as shown in FIG. 3, the joint mechanism 510 rotates the first shoulder section 241 with respect to the body 220 around a rotation axis O2' perpendicular to the rotation axis O1, the joint mechanism 520 rotates the second shoulder section 242 with respect to the first shoulder section 241 around a rotation axis O3' perpendicular to the rotation axis O2', the twist mechanism 530 rotates (twists) the upper arm section 243 with respect to the second shoulder section 242 around a rotation axis O4' perpendicular to the rotation axis O3', the joint mechanism 540 rotates the first lower arm section 244 with respect to the upper arm section 243 around a rotation axis O5' perpendicular to the rotation axis O4', the twist mechanism 550 rotates (twists) the second lower arm section 245 with respect to the first lower arm section 244 around a rotation axis O6' perpendicular to the rotation axis O5', the joint mechanism 560 rotates the wrist section 246 with respect to the second lower arm section 245 around a rotation axis O7' perpendicular to the rotation axis O6', and the twist mechanism 570 rotates (twists) the connector section 247 with respect to the wrist section 246 around a rotation axis O8' perpendicular to the rotation axis O7'.

According to such an articulated arm 240 as described above, bending/unbending of the joints (the shoulder, the elbow, and the wrist) and twist of the upper arm and the lower arm can be realized similar to the human arm with a relatively simple configuration.

The configuration of each of the joint mechanism 510, the joint mechanism 520, the twist mechanism 530, the joint mechanism 540, the twist mechanism 550, the joint mechanism 560, and the twist mechanism 570 is not particularly limited, but in the present embodiment, the configuration is substantially the same as the configuration of the joint mechanism 310 described above. Specifically, as shown in FIG. 5, the joint mechanism 510 includes an electric motor 511 as a drive source, a reduction gear (not shown) for reducing the rotational speed of the electric motor 511, and a position sensor 512 for detecting the rotational angle of the electric motor 511. Further, the joint mechanism 520 includes an electric motor 521 as a drive source, a reduction gear (not shown) for reducing the rotational speed of the electric motor 521, and a position sensor 522 for detecting the rotational angle of the electric motor 521. Further, the twist mechanism 530 includes an electric motor 531 as a drive source, a reduction gear (not shown) for reducing the rotational speed of the electric motor 531, and a position sensor 532 for detecting the rotational angle of the electric motor 531. Further, the joint mechanism 540 includes an electric motor 541 as a drive source, a reduction gear (not shown) for reducing the rotational speed of the electric motor 541, and a position sensor 542 for detecting the rotational angle of the electric motor 541. Further, the twist mechanism 550 includes an electric motor 551 as a drive source, a reduction gear (not shown) for reducing the rotational speed of the electric motor 551, and a position sensor 552 for detecting the rotational angle of the electric motor 551. Further, the joint mechanism 560 includes an electric motor 561 as a drive source, a reduction gear (not shown) for reducing the rotational speed of the electric motor 561, and a position sensor 562 for detecting the rotational angle of the electric motor 561. Further, the twist mechanism 570 includes an electric motor 571 as a drive source, a reduction gear (not shown) for reducing the rotational speed of the electric motor 571, and a position sensor 572 for detecting the rotational angle of the electric motor 571.

End Effectors

The end effectors 610, 620 to be attached to the tips of the respective articulated arms 230, 240 have a function of, for example, gripping an object. Although the configuration of each of the end effectors 610, 620 varies by the operation to be performed, it is possible to adopt a configuration, for example, having first fingers 611, 621 and second fingers 612, 622 as shown in FIG. 4. Each of the end effectors 610, 620 having such a configuration as described above is capable of gripping the object by controlling the distance between the first fingers 611, 621 and the second fingers 612, 622.

The kinesthetic sensors 740, 750 respectively disposed between the hand sections 238, 248 and the end effectors 610, 620 each have a function of detecting an external force applied to the end effectors 610, 620. Further, by feeding back the force detected by the kinesthetic sensors 740, 750 to the robot control device 900, the robot 100 can more precisely perform the operation. Further, contact between the end effectors 610, 620 and an obstacle and so on can be detected using the force and the moment detected by the kinesthetic sensors 740, 750. Therefore, an obstacle avoidance action, an object damage avoidance action, and so on can easily be performed. The kinesthetic sensors 740, 750 are not particularly limited so long as the sensors are capable of detecting the force component and the moment component of each of three axes perpendicular to each other, and known kinesthetic sensors can be used.

Robot Control Device

The robot control device 900 can make the body 220, and/or the articulated arms 230, 240 operate independently of each other. In other words, the robot control device 900 can independently control the electric motors 311, 411 through 471, and 511 through 571 provided to the joint mechanisms 310, 410, 420, 440, 460, 510, 520, 540, and 560 and the twist mechanisms 430, 450, 470, 530, 550, and 570 via motor drivers and so on. On this occasion, the robot control device 900 performs detection using the position sensors 312, 412 through 472, and 512 through 572, and then controls the drive (e.g., the angular velocities and the rotational angles) of the electric motors 311, 411 through 471, and 511 through 571 based on the detection results. The control program is stored in advance in a recording medium (not shown) incorporated in a processor of the robot control device 900.

Further, the robot control device 900 can also make the elevating mechanism 800 operate independently.

Specifically, as shown in FIG. 5, the robot control device 900 includes a first drive source control section 901 for controlling drive of the electric motor 311, a second drive source control section 902 for controlling drive of the electric motor 411, a third drive source control section 903 for controlling drive of the electric motor 421, a fourth drive source control section 904 for controlling drive of the electric motor 431, a fifth drive source control section 905 for controlling drive of the electric motor 441, a sixth drive source control section 906 for controlling drive of the electric motor 451, a seventh drive source control section 907 for controlling drive of the electric motor 461, an eighth drive source control section 908 for controlling drive of the electric motor 471, a ninth drive source control section 909 for controlling drive of the electric motor 511, a tenth drive source control section 910 for controlling drive of the electric motor 521, an eleventh drive source control section 911 for controlling drive of the electric motor 531, a twelfth drive source control section 912 for controlling drive of the electric motor 541, a thirteenth drive source control section 913 for controlling drive of the electric motor 551, a fourteenth drive source control section 914 for controlling drive of the electric motor 561, a fifteenth drive source control section 915 for controlling drive of the electric motor 571, a sixteenth drive source control section 916 for controlling drive of the electric motor 850.

Since the configurations of the first through fifteenth drive source control sections 901 through 915 are substantially the same as each other, an example of the first drive source control section 901 will hereinafter be explained as a representative, and the explanation of the rest, namely the second through fifteenth drive source control sections 902 through 915 will be omitted.

As shown in FIG. 6, the first drive source control section 901 includes a subtractor 901a, a position control section 901b, a subtractor 901c, an angular velocity control section 901d, a rotational angle calculation section 901e, and an angular velocity calculation section 901f. Further, the detection signal is input to the first drive source control section 901 from the position sensor 312 in addition to a command position Pc of the electric motor 311. The first drive source control section 901 drives the electric motor 311 so that the rotational angle (a position feedback value Pfb) of the electric motor 311 calculated from the detection signal of the position sensor 312 becomes equal to the command position Pc, and an angular velocity feedback value ωfb described later becomes equal to a command angular velocity ωc described later due to the feedback control using the respective detection signals.

Specifically, the command position Pc is input to the subtractor 901a, and further the position feedback value Pfb described later is input to the subtractor 901a from the rotational angle calculation section 901e. In the rotational angle calculation section 901e, the number of pulses input from the position sensor 312 is counted, and at the same time, the rotational angle of the electric motor 311 corresponding to the count value is output to the subtractor 901a as the position feedback value Pfb. The subtractor 901a outputs the difference (the value obtained by subtracting the position feedback value Pfb from the target value of the rotational angle of the electric motor 311) between the command position Pc and the position feedback value Pfb to the position control section 901b.

The position control section 901b performs a predetermined arithmetic process using the difference input from the subtractor 901a, a proportional gain as a predetermined coefficient, and so on to thereby calculate the target value of the angular velocity of the electric motor 311 corresponding to the difference. The position control section 901b outputs a signal representing the target value (command value) of the angular velocity of the electric motor 311 to the subtractor 901c as the command angular velocity ωc.

Further, in the angular velocity calculation section 901f, the angular velocity of the electric motor 311 is calculated based on the frequency of the pulse signal input from the position sensor 312, and then the angular velocity is output to the subtractor 901c as the angular velocity feedback value ωfb.

The command angular velocity ωc and the angular velocity feedback value ωfb are input to the subtractor 901c. The subtractor 901c outputs the difference (the value obtained by subtracting the angular velocity feedback value ωfb from the target value of the angular velocity of the electric motor 311) between the command angular velocity ωc and the angular velocity feedback value ωfb to the angular velocity control section 901d.

The angular velocity control section 901d performs a predetermined arithmetic process including the integration using the difference input from the subtractor 901c, a proportional gain and an integral gain as predetermined coefficients, and so on to thereby generate the drive signal of the electric motor 311 corresponding to the difference, and then supplies the electric motor 311 with the drive signal via the motor driver.

Thus, the feedback control is performed so that the position feedback value Pfb is approximated to the command position Pc as much as possible, and at the same time, the angular velocity feedback value ωfb is approximated to the command angular velocity ωc as much as possible, and thus, the drive (the rotation of the body 220) of the electric motor 311 is controlled.

Next, the drive (the control by the sixteenth drive source control section 916) of the elevating mechanism 800 will be explained. The elevating mechanism 800 is used for controlling the height (the position) of the body 200 with respect to the workbench. By providing the body 220 with a desired height with respect to the workbench, it is possible to make the drive range of the articulated arms 230, 240 as desired, and thus, the drive range and the posture can be prevented from being involuntarily limited. Therefore, excellent workability and safety can be obtained.

The height (the height from the floor) of the body 220 is set in, for example, the following manner. Firstly, as shown in FIG. 7A, the robot 100 is installed so as to face the workbench 1000, and then the body 220 is set to a body reference position by making the elevating mechanism 800 operate if necessary. The body reference position is set to a position sufficiently higher than the possible height of the workbench, and the information thereof has previously been stored in a storage section (not shown) provided to the robot control device 900. It should be noted that the body reference position can also be set as desired by an administrator (e.g., the operator of the robot 100) in accordance with the height of the workbench 1000.

Further, as shown in FIG. 7A, the articulated arms 230, 240 are respectively set to arm reference postures by driving the joint mechanisms 410, 420, 440, 460, 510, 520, 540, and 560 and the twist mechanisms 430, 450, 470, 530, 550, and 570 if necessary. The arm reference postures are configured so that the end effectors 610, 620 contact the workbench 1000 ahead of the articulated arms 230, 240. The arm reference postures in the present embodiment are configured so that the end effectors 610, 620 are located on the lower side of the articulated arms 230, 240, and at the same time, the finger tips face downward. Further, the arm reference postures of the present embodiment are configured so that the heights of the lower ends of the respective end effectors 610, 620 are equal to each other (i.e., the lower ends are aligned (coplanar) in a horizontal direction). Thus, a tilt of the workbench 1000 can easily be detected as described later. It should be noted that the information (hereinafter simply referred to as "position information"), which is related to the heights (the positions) of the end effectors 610, 620 in the case in which the body 220 is located at the body reference position, and the articulated arms 230, 240 are set to the reference postures, is stored in the robot control device 900 in advance.

Then, the body 220 is moved downward from the body reference position using the elevating mechanism 800 while keeping the articulated arms 230, 240 in the arm reference postures. When moving the body 220 downward, the articulated arms 230, 240 also move downward together with the body 220, and eventually, as shown in FIG. 7B, the lower ends of the end effectors 610, 620 contact the workbench 1000. When the end effectors 610, 620 contact the workbench 1000, the stresses (force components) caused by the contact are respectively detected by the kinesthetic sensors 740, 750. Therefore, the robot control device 900 detects the fact that the end effectors 610, 620 have contacted the workbench 1000 based on the detection results from the kinesthetic sensors 740, 750. Then, after the end effectors 610, 620 contact the workbench 1000, the robot control device 900 promptly stops the downward movement of the body 220. It should be noted that the height of the body 220 at which the end effectors 610, 620 contact the workbench is hereinafter referred to as an "arm contact position" for the sake of convenience of explanation.

Then, the robot control device 900 obtains the amount of lowering (moving distance) of the body 220 from the body reference position to the arm contact position based on the signal output from the position sensor 312, and then determines the height of the workbench 1000 based on the amount of lowering and the position information of the end effectors 610, 620. Thus, the height of the workbench 1000 can easily and surely be detected.

Then, the robot control device 900 obtains the height of the body 220 desirable for the height of the workbench 1000. Then, the robot control device 900 drives of the elevating mechanism 800 to set the body 220 to the height thus obtained, and then controls the operation of the robot 100 in this state. It should be noted that it is also possible to store the relationship between the height of the workbench 1000 and the height of the body 220 suitable for various workbench heights in advance as a table list.

Here, the workbench 1000 is normally horizontal. Therefore, the robot program is also generated on the assumption that the workbench 1000 is horizontal. Therefore, if the workbench 1000 is tilted with respect to the horizontal plane, a problem might be encountered in the operation of the robot 100. Therefore, the robot 100 is configured so as to detect a tilt of the workbench 1000, and then to correct the robot program based on the result.

For example, since the lower ends of the end effectors 610, 620 are aligned along a horizontal plane in the arm reference postures, if the workbench 1000 is horizontal, the end effectors 610, 620 should contact the workbench 1000 at roughly the same time as shown in FIG. 7B. Therefore, in the case in which the end effectors 610, 620 contact the workbench at roughly the same time (in other words, in the case in which the force component is detected at roughly the same time by the kinesthetic sensors 740, 750) when moving the body 220 downward from the body reference position using the elevating mechanism 800 while keeping the articulated arms 230, 240 in the arm reference postures, the robot control device 900 determines that the workbench 1000 is horizontal, and does not perform a correction of the robot program. In contrast, for example, as shown in FIGS. 8A and 8B, in the case in which the end effector 610 contacts the workbench 1000 first, and then the end effector 620 subsequently contacts the workbench 1000, the robot control device 900 detects the tilt θ of the workbench 1000 based on a difference ΔT (=T1−T2) between the height T1 of the body 220 at the moment when the end effector 610 contacts the workbench 1000 and the height T2 of the body 220 at the moment when the end effector 620 contacts the workbench 1000, and a distance D between the parts of the respective end effectors 610, 620 contacting the workbench 1000, and then corrects the robot program in accordance with the tilt θ of the workbench 1000. Thus, the tilt of the workbench 1000 is taken into consideration, and thus, excellent workability can be obtained. It should be noted that in the case of further moving the body 220 downward in the state in which the end effector 610 contacts the workbench 1000 in order to make the end effector 620 contact the workbench 1000, an excessive load might be applied to the end effector 610. Therefore, in such a case, it is preferable that the articulated arm 230 is moved so that the end effector 610 is lifted from the workbench 1000 after the end effector 610 has contacted the workbench 1000.

Although the robot and the method of operating the robot according to the invention are hereinabove explained based on the embodiment shown in the accompanying drawings, the invention is not limited to the embodiment, and the configuration of each of the components can be replaced with one having an equivalent function and an arbitrary configuration. Further, it is possible to add any other constituents without departing from the gist of the invention.

Further, although in the embodiment described above, the movable (rolling) robot is explained, it is possible for the robot to be fixed to a floor, a ceiling, a wall, and so on of a working room with bolts. Further, although in the embodiment described above, the robot is disposed on the floor surface, and the body moves in the vertical direction, the arrangement of the robot is not limited to the embodiment, but it is also possible to adopt, for example, a configuration in which the base is fixed to the ceiling, and the body moves in a vertical direction, or a configuration in which the base is fixed to the wall surface, and the body moves in a horizontal direction.

Further, although in the embodiment described above, the number of rotation axes of the robot is 15, the invention is not so limited, but rather the number of rotation axes of the robot can be in a range of 1 through 14, or can be equal to or larger than 16.

What is claimed is:

1. A robot comprising:
a base;
rotating members provided to the base;
a grip section provided to the base;
a body connected to the base;
a pair of articulated arms rotatably connected to the body;
a moving mechanism configured to move the body toward or away from the base;
a position sensor disposed in the moving mechanism, the position sensor being configured to detect a position of the body relative to the base so as to output a position detection signal; and
a robot controller provided to the base, the robot controller being configured to control the moving mechanism based on the position detection signal.

2. The robot according to claim 1,
wherein the robot controller is inside the base.

3. The robot according to claim 2 further comprising:
a contact member contacting a workbench.

4. The robot according to claim 3,
wherein the contact member is provided to the base.

5. The robot according to claim 3,
wherein the contact member is provided to the moving mechanism.

6. The robot according to claim 2 further comprising:
an emergency stop button provided to the base.

7. The robot according to claim 2 further comprising:
a signal light showing a state of the robot and provided to the body.

8. The robot according to claim 7,
wherein the signal light is rod-shaped.

9. The robot according to claim 1 further comprising:
a contact member contacting a workbench.

10. The robot according to claim 9,
wherein the contact member is provided to the base.

11. The robot according to claim 9,
wherein the contact member is provided to the moving mechanism.

12. The robot according to claim 1 further comprising:
an emergency stop button provided to the base.

13. The robot according to claim 1 further comprising:
a signal light showing a state of the robot and provided to the body.

14. The robot according to claim 13,
wherein the signal light is rod-shaped.

15. The robot according to claim 1 further comprising:
an imaging device provided to the body.

16. The robot according to claim 1,
wherein the robot is a dual-arm robot.

* * * * *